United States Patent
Van Renesse (10) Patent No.: US 6,411,967 B1
(45) Date of Patent: Jun. 25, 2002

(54) DISTRIBUTED PROCESSING SYSTEM WITH REPLICATED MANAGEMENT INFORMATION BASE

(75) Inventor: Robbert Van Renesse, Ithaca, NY (US)

(73) Assignee: Reliable Network Solutions, Ithaca, NY (US)

( * ) Notice: Subject to any disclaimer, the term of this patent is extended or adjusted under 35 U.S.C. 154(b) by 0 days.

(21) Appl. No.: 09/335,955

(22) Filed: Jun. 18, 1999

(51) Int. Cl.[7] ............................................... G06F 17/30
(52) U.S. Cl. ...................................... 707/201; 709/223
(58) Field of Search ......................... 707/201; 709/223, 709/200

(56) References Cited

U.S. PATENT DOCUMENTS

| | | | | |
|---|---|---|---|---|
| 5,737,601 A | * | 4/1998 | Jain et al. .................... | 707/201 |
| 5,806,075 A | * | 9/1998 | Jain et al. .................... | 707/201 |
| 5,870,759 A | * | 2/1999 | Bauer et al. ................. | 707/201 |
| 6,058,401 A | * | 5/2000 | Stamos et al. .............. | 707/201 |
| 6,144,970 A | * | 11/2000 | Bonner et al. .............. | 707/206 |
| 6,182,117 B1 | * | 1/2001 | Christie et al. ............. | 709/205 |
| 2002/0002557 A1 | * | 1/2002 | Straube et al. .............. | 707/103 |

OTHER PUBLICATIONS

Robbert van Renesse et al., "A Gossip–Style Failure Detection Service", Dept. Comp. Science, Cornell University, pp. 1–16, 1996.

Alan Demers et al., "Epidemic Algorithms for Replicated Database Maintenance", Xerox Palo Alto Research Center, Aug., 1987, pp. 8–32.

Richard A. Golding, "Weak–Consistency Group Communication and Membership", University of California Santa Cruz, Dec. 1992, pp. 1–154.

* cited by examiner

Primary Examiner—Kenneth R. Coulter
(74) Attorney, Agent, or Firm—Cesari and McKenna, LLP (57) ABSTRACT

A replicated management information base (RMIB), or replicated spreadsheet, is maintained at nodes to share information among the nodes. The RMIB includes columns, or categories, of the information to be shared and rows for the respective "member" nodes. Each member node is responsible for the contents of its own row. When the node updates its row, the node sends out an update message to the other members. As the update message propagates through the membership, each member updates the row in its copy, or view, of the RMIB. The nodes may include version numbers in the update messages, so that the receiving node ignores older messages or applies the messages in order. The member nodes may gossip among themselves, to ensure that each node receives the most recent updates. Also, the nodes may monitor their respective network interfaces and send as updates any changes to the status of the interfaces. The nodes may also include the interface status information in the gossip messages, such that the receiving nodes send update information to active interfaces. The nodes may select nodes on each sub-network and send the update messages to the selected nodes. The selected nodes then broadcast the update messages to the members on their respective sub-networks.

28 Claims, 7 Drawing Sheets

FIG. 1

| NODE ID | HOST | OP. SYS | LOAD | DB | TRANSACTION | DISK SPACE | LOCAL STATUS |
|---|---|---|---|---|---|---|---|
| XXX | SS | SUN5.6 | 0.3 | TRUE | VOTED NO | 20G | UP |
| YYY | RR | NT 5.0 | 0.0 | FALSE | | 40G | UP |
| ZZZ | HH | NT 5.0 | 2.3 | TRUE | ABORTED | 5G | UP |
| WWW | TT | SUN 5.6 | 1.5 | FALSE | VOTED YES | 10G | UP |
| ... | | | | | | | |
| GGG | MM | SUN 5.6 | 1.5 | FALSE | | 15G | UP |

DISTRIBUTED PROCESSING SYSTEM WITH REPLICATED MANAGEMENT INFORMATION BASE

BACKGROUND OF THE INVENTION

Information is shared across distributed systems, or networks, generally by either a messaging scheme or a shared virtual memory mechanism. The messaging schemes typically require that the system nodes maintain up-to-date topology information. Further, the nodes must exchange certain specific series of messages to convey desired information between the nodes, and may require that the nodes send queries to determine, for example, if any changes in status have occurred. The messaging schemes are thus relatively difficult to use for certain applications. Also, if one or more of the nodes fail, the messaging schemes may become unreliable.

The shared memory systems do not scale well, since they require the nodes to coordinate their shared memory activities across the network. Accordingly, the complexity of these systems increases as the number of nodes increases.

SUMMARY OF THE INVENTION

The invention is a replicated management information base (RMIB), or replicated spreadsheet, that includes columns, or categories, of information to be shared and rows for the respective "member" nodes, and also a system for maintaining the RMIB. Each member node maintains a copy, or view, of the RMIB, and is responsible for the contents of its own row. When the node updates its row, the node sends out an update message to the other members. As the update message propagates through the membership, each member updates the row in its copy of the RMIB. The node-specific information in the RMIB is readily updated without requiring the nodes to, for example, inquire about the status of other nodes or coordinate shared memory activities, as is required by known prior systems.

For more robust implementation, the nodes include version numbers in the update messages, so that the receiving node ignores older messages or at least applies the messages in order, as discussed below. Further, the member nodes may gossip among themselves, to ensure that each node receives the most recent updates, also as discussed below.

BRIEF DESCRIPTION OF THE DRAWINGS

The invention description below refers to the accompanying drawings, of which.

DETAILED DESCRIPTION OF AN ILLUSTRATIVE EMBODIMENT

A. REPLICATED MANAGEMENT INFORMATION BASE

Figure 1:
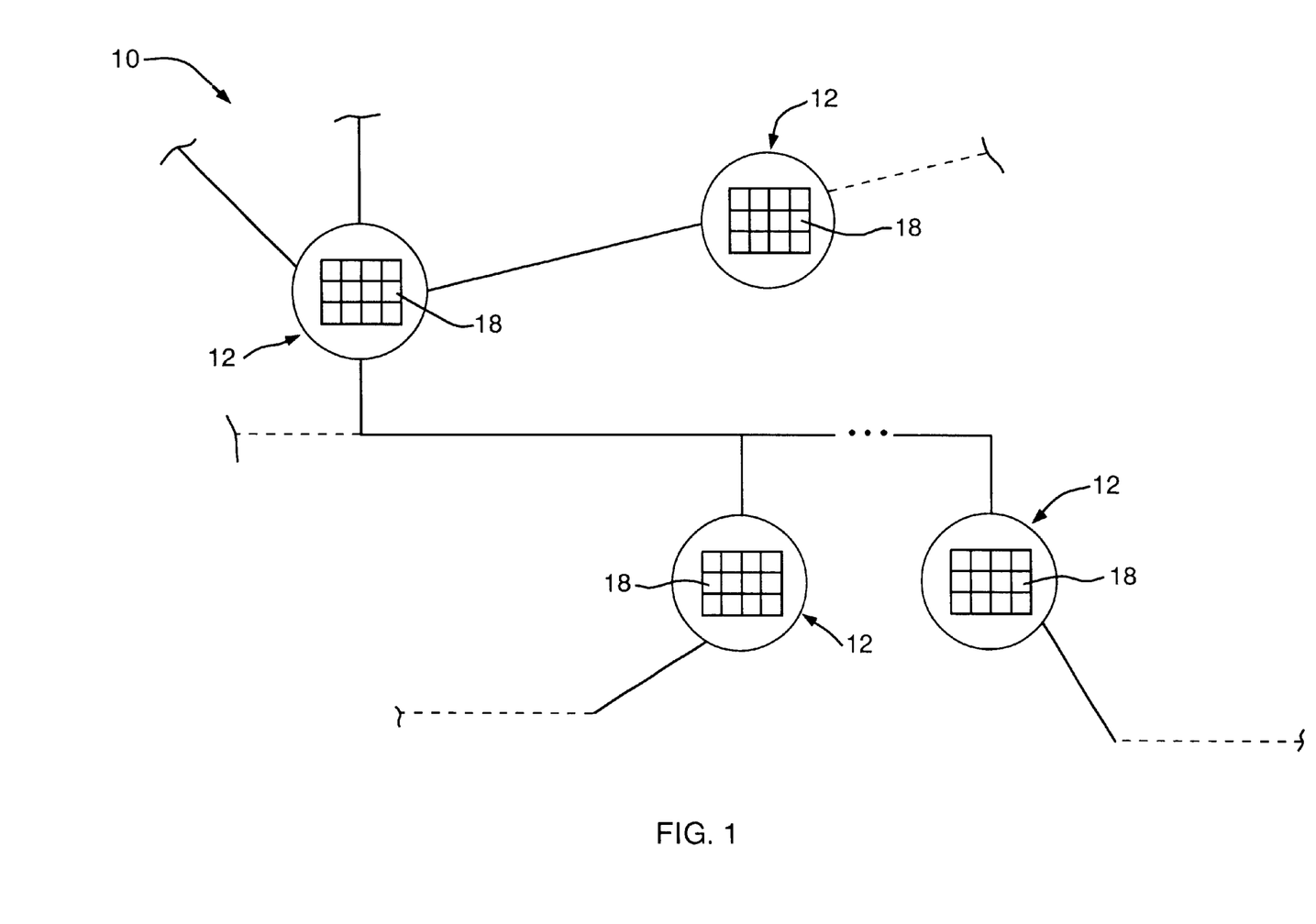
FIG. 1 is a functional block diagram of a system constructed in accordance with the invention.

Referring now to FIG. 1, a network 10 includes a plurality of nodes 12. A given node shares certain information with one or more of the other nodes through a replicated management information base (RMIB) 18. A node that provides information to the RMIB is a "member" of that RMIB, and a node may be a member of more than one RMIB. Each node maintains a copy, or replica, of each RMIB to which it belongs, and updates them based on update information that the node receives from the other member nodes.

Figure 2:
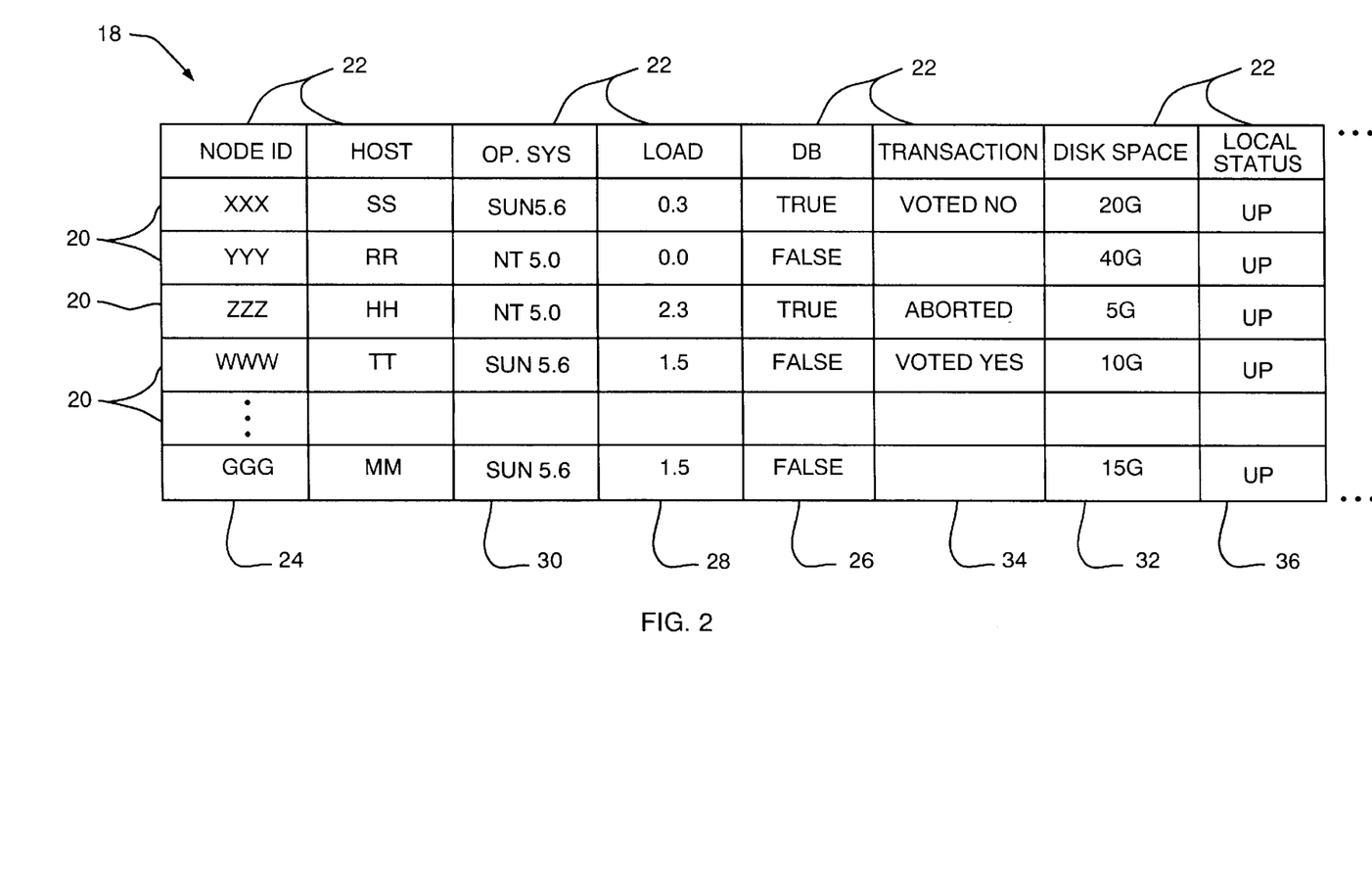
FIG. 2 depicts an RMIB in more detail.

Referring also to FIG. 2, the RMIB 18 is organized essentially as a spreadsheet that includes a row 20 for each member node and a plurality of columns 22 for various categories of information that are shared by the member nodes. The member nodes provide the entries for their own rows, update the entries, as appropriate, and inform the other members of the updates. As discussed in more detail below, the RMIB at one member node may differ at any given time from the RMIB at another member node, particularly as the update information propagates through the membership. We refer herein to the current state of an RMIB at a given node as the node's "view" of the RMIB 18, and to the node as the "viewing node."

Each row 20 of the RMIB 18 includes at least an entry in the node identifier column 24. The entry uniquely identifies the associated node, and thus, the particular row of the RMIB. Accordingly, no two rows may contain the same node identifier value, and no row may be empty.

As depicted in the drawing, the rows 20 may also include various entries in additional columns, which are related to, for example, a particular application or a particular set of users. As an example, the RMIB 18 depicted in the drawing contains information that a system manager uses to determine where to run copies of a replicated data base. The system manager would like to run the copies of the data base from the less loaded nodes. Accordingly, the RMIB includes a Load column, or category, 28 with entries that indicate the current relative loads for the respective nodes, and a DB, or data base, category 26 with entries that indicate whether or not the respective nodes are running the data base servers.

In the example, the system manager determines where to run the copies of the data base by first sorting the RMIB by load, and then determining if the copies of the data base are running on, for example, three out of the ten least loaded member nodes. The system manager may then start, terminate or move one or more of the data base servers, as appropriate, to run the database copies over the less loaded nodes. Presumably, the copies of the data base cannot be run by every node and other information, such as the operating systems running on the respective member nodes (column 30), the amount of available disk space on each of the nodes (column 32), and so forth, is of interest to the system manager, and thus, included in the RMIB 18.

The task of relocating the data base servers can be readily automated, by an application that periodically consults the relevant information contained in the RMIB 18. Alternatively, the application may receive reports of changes to the relevant information in the RMIB, and relocate the servers as needed.

When a data base server is moved from one node to another, the RMIB rows 20 that correspond to these nodes must be updated. Each of these nodes thus changes its entry in the DB column of its view of the RMIB to the appropriate "true"or "false" value. Each node then supplies the updated row information to the other member nodes in the form of a row update message.

The row update message lists the row entries by column, or category:

Update(category$_1$=value$_1$, category$_2$=value$_2$ ... )

The value in the node identifier category identifies the row to which the update applies. A node receiving the update message uses an upcall function to include the information contained therein in the appropriate row of its view of the RMIB. The upcall function thus replaces the row with the information contained in the row update message. When the node receives a next update message for the same row, the node again uses the upcall function to replace the row, and so forth. As appropriate, the receiving node reports the update to a user or an application.

The data base users also rely on the information in the DB column of the RMIB, to determine at any given time how to access the data base. The member nodes may, however, have different views of the RMIB 18, as the update information propagates over the membership. Accordingly, a user may receive out dated access information. If the user tries a listed node and does not gain access, the user tries a next listed node, and so forth. It is unlikely that all of the copies of the data base will have moved since the RMIB was last updated, since the data bases are run on a subset of a relatively large number of the nodes, i.e., three out of the ten least loaded nodes. Accordingly, the user will ordinarily be able to gain access to the data base through at least one of the listed nodes. In the unlikely event that all of the copies have moved, the user again consults the RMIB to check for updated data base access information.

The RMIB 18 may be also used to provide status information to the members nodes. For example, the RMIB depicted in FIG. 2 includes a column 34 that is associated with a two-phase commit protocol. Each node that participates in the protocol specifies its current state in the appropriate row and column of the RMIB, while a member node that is not participating in the protocol leaves the corresponding entry empty, or alternatively supplies a value that indicates non-participation. Each participating node sends update messages, as appropriate, to inform the other members of any changes in state. The participating nodes can then monitor the RMIB to determine the current state of each of the participating nodes and respond to any changes, without periodically having to query the other participating nodes.

The columns 22 of the RMIB 18 may be created and removed dynamically by the applications, when information is either newly required or no longer needed. The rows of the RMIB 18 may also be added or removed, depending on whether or not the viewing node can reach, that is, can communicate with, the respective member nodes. Accordingly, failed (down) nodes are removed from the view and booting (up) nodes are added. The ways in which the viewing node determines that a member node is up or down are discussed below.

The RMIB system may be implemented more efficiently by including a version number and certain other information in the update messages, gossiping about the updates, and/or implementing various other mechanisms that may be well suited for particular types of applications. We discuss various implementations below.

B. UPDATE VERSION NUMBERS

Figure 3:
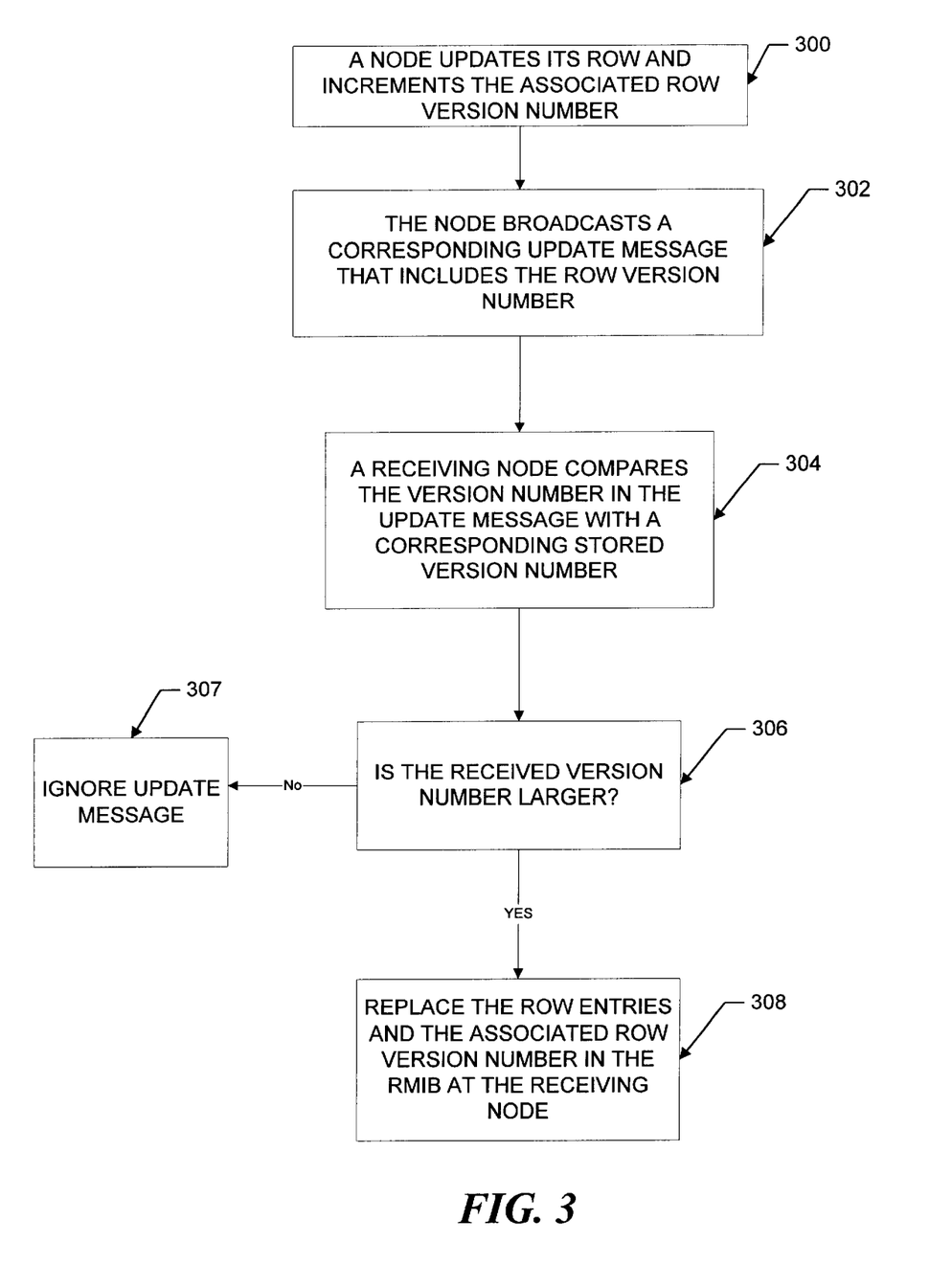
FIG. 3 a flow chart of the operations of the system to updating the RMIBs.

Referring also to FIG. 3, the nodes include in the update messages row version numbers that are used by the receiving node to ensure that an RMIB is updated with more recent information. Specifically, when a node updates its own row, it increments a stored row version number and includes the version number in a row update message that it then broadcasts to the member nodes (steps 300–302). A receiving node compares the version number in the received update message with the version number of the update last applied to the associated row (step 304). If the version number in the update message is smaller than the row version number in the previously applied update, the receiving node ignores the update message (steps 306, 307). Otherwise, the receiving node replaces the identified row and the associated row version number with the information contained in the update message (step 306, 308). If the update message identifies a row that is unknown to the receiving node, the node adds the row to the RMIB and stores the included row version number. By using the version numbers, the view of the RMIB at a given node is updated with the most current update information that the node receives, regardless of the order in which the update messages arrive at the node.

C. GOSSIPING WITH VERSION NUMBERS

Figure 4:
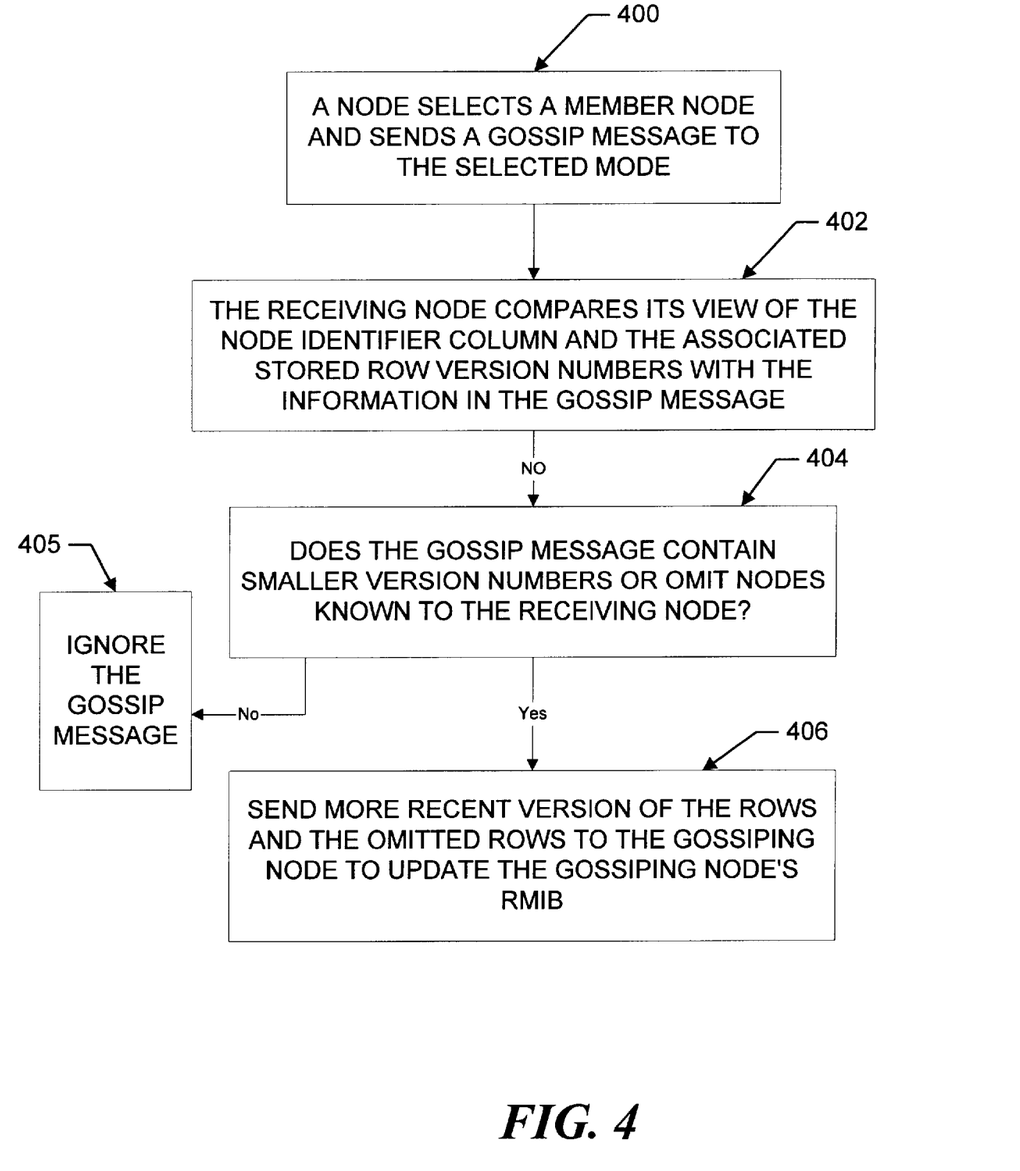
FIG. 4 is a flow chart of the further operations of the system to update the RMIB.

Referring now to FIG. 4, the nodes may also gossip about the updates to one another. Each node, at regular intervals, selects another member node at random and sends to the selected node a gossip message that includes the node identifier column entries and the associated row version numbers (step 400). When a node receives the gossip message, the node compares the information contained therein with the node's view of the node identifier column and the associated stored version numbers (step 402). If the RMIB at the receiving node has a later version of a row or a row that is not listed in the gossip message, the receiving node sends the associated row or rows back to the gossiping node and gossiping node updates its view with the more up-to-date information (steps 404, 406). Otherwise, the receiving node ignores the update message (steps 404, 405). In this way, each view will eventually contain the most up-to-date information, without requiring the nodes to solicit the information.

D. GOSSIPING AND FAILURE DETECTION

The gossip messages may also include information from which a receiving node can detect the failures of the member nodes. Each time a node sends out a gossip message, the node increments a "heart beat count" and includes the count in the message. A receiving node replaces the stored count associated with the gossiping node with the larger count in the gossip message and notes the time of the change to the count. Thereafter, the receiving node monitors the times of the updates to the count to determine if the gossiping node is still active.

The gossiping node may also include in the gossip message a list of the stored heart beat counts associated with the other member nodes. The receiving node then compares the counts it has stored with the counts listed in the gossip message. If any received counts are larger, the receiving node updates the corresponding entries in its list and notes the times of the updates.

When the heart beat count for a given node, for example, node A, has not been updated within a predetermined time interval, the receiving node determines that the node A is no longer active, and has thus failed. The failure of the node A is detected at different times by the various member nodes, depending in large part on when each of the nodes last received a message with an updated count for the failed node. Accordingly, information about the node A will be included in later gossip messages from at least some of the member nodes, and care must be taken to treat this gossiped information as old information.

The RMIB status column for this application includes in each entry the status of the member nodes as determined by the node to which the row belongs. The status column contains "up" listings for the member nodes with which the node can communicate, and faulty listings for the member nodes that the node determines are down. When a receiving node determines that a node, for example, node A, is no longer active, the receiving node changes its status column entry for that node to "faulty," and broadcasts the change to the other member nodes. The receiving node waits to remove the node A from its view of the RMIB, however, until after an additional predetermined time period passes without an updating of the associated heart beat counter. This additional time period is associated with the estimated time that it takes for the entire membership to determine that the node A has failed.

If a gossip message that contains a heart beat count for the node A should arrive at the receiving node after the node has labeled the node A faulty and before the node A is removed from the RMIB, the receiving node compares the count in the message with the stored heart beat count. Presumably, the counts are the same and the receiving node makes no change to the stored count. If, however, a gossip message that contains a heart beat count for node A arrives after the receiving node has removed node A from the RMIB, that is, after the member nodes should have detected the failure of the node A, the receiving node treats the node A as a new node. The receiving node thus includes a row for the node in the RMIB, and stores the associated heart beat count and update time. In this way, the node A is readily included in the membership after a re-boot.

A booting node broadcasts its status to the membership as an update message, and the nodes receiving the update message add the node to their respective views of the RMIB. The nodes that do not receive the update message will learn of the booting node by gossiping, and also add the new node to their views. The booting node also quickly learns the status of each of the nodes in the membership through the update and gossip messages, all without having to send out queries.

E. REDUCED-SIZE UPDATE MESSAGES

The update messages discussed above include all of the entries for the updated row, and the upcall function replaces the entire row, regardless of how many or how few of the row entries have changed. The update messages may instead omit those entries that have not changed since the last update message. The update message must, however, include the node identifier and the row version number, so that the receiving node can properly apply the update. The update messages are thus generally shorter than the row update messages discussed above.

A node receiving an update message compares the version number included therein with the stored version number associated with the identified row, and applies the update if the version number in the received update message is the next highest version number. Otherwise, the receiving node ignores the update message and waits for the next update message in the sequence to be supplied through gossiping. In this way, the node applies the updates in order.

The nodes may aggregate updates to the same row and send them as part of the same update message. The system may also set a maximum rate for the sending of the update messages, if the updates occur often. The maximum rate may, for example, be tied to the load that the network can sustain, or to a desired rate for the arrival of incoming update messages at the member nodes. The system may also prioritize the update message by assigning different maximum rates to the updates of particular nodes and/or to the updates of particular RMIB columns, and so forth. The update mechanism can thus provide certain updated information to the members relatively quickly, or alternatively, relatively slowly.

F. OUT OF ORDER MESSAGES

By keeping track of the updates to ensure that all of them are applied to a given row, the nodes may utilize the information in the update messages that are received out of order. To allow the updates to be applied out of order, the update messages "U" include sequence numbers K,M in which the first number K is the version to which the $M^{th}$ update is applied. When two updates $U_{V,V+1}$ and $U_{V+1,V+2}$ are applied in order, they produce a "composite" update $U_{V,V+2}$. Two updates $U_{I,J}$ and $U_{K,M}$ "overlap" if $J \geq K$ and $M \geq I$. The overlapping updates form a composite update $U_{min(I,K),max(J,M)}$ by first applying $U_{I,J}$ and then $U_{K,M}$ with J<M, where min() and max () are the minimum and maximum values of the respective indices.

Consider a row 20 in an RMIB 18 that has certain categories or columns a, b, c, d. After the information in update messages $U_{0,1}$ to $U_{V-1,V}$ are applied to the row, the columns contain the following entries:

a=1, b=4, c=2, d=10

A next update message $U_{V,V+1}$ includes the entries b=5, c=3 and produces:

a=1, b=5, c=3, d=10 and update message $U_{1,2}$ that includes the entries a=2, b=3 produces:

a=2, b=3, c=3, d=10

The two update messages $U_{V,V+1}$ and $U_{V+1,V+2}$ can be combined into a composite update message $U_{V,V+2}$, which includes the entry c=3 from $U_{V,V+1}$ and the entries a=2, b=3 from $U_{V+1,V+2}$, and when the composite message is applied to the version V of the row it produces the same entries as applying the overlapping messages in order, namely:

a=2, b=3, c=3, d=10

Similarly, a next update message $U_{V+2,V+3}$ can be include in a composite update message $U_{V,V+3}$.

Figure 5:
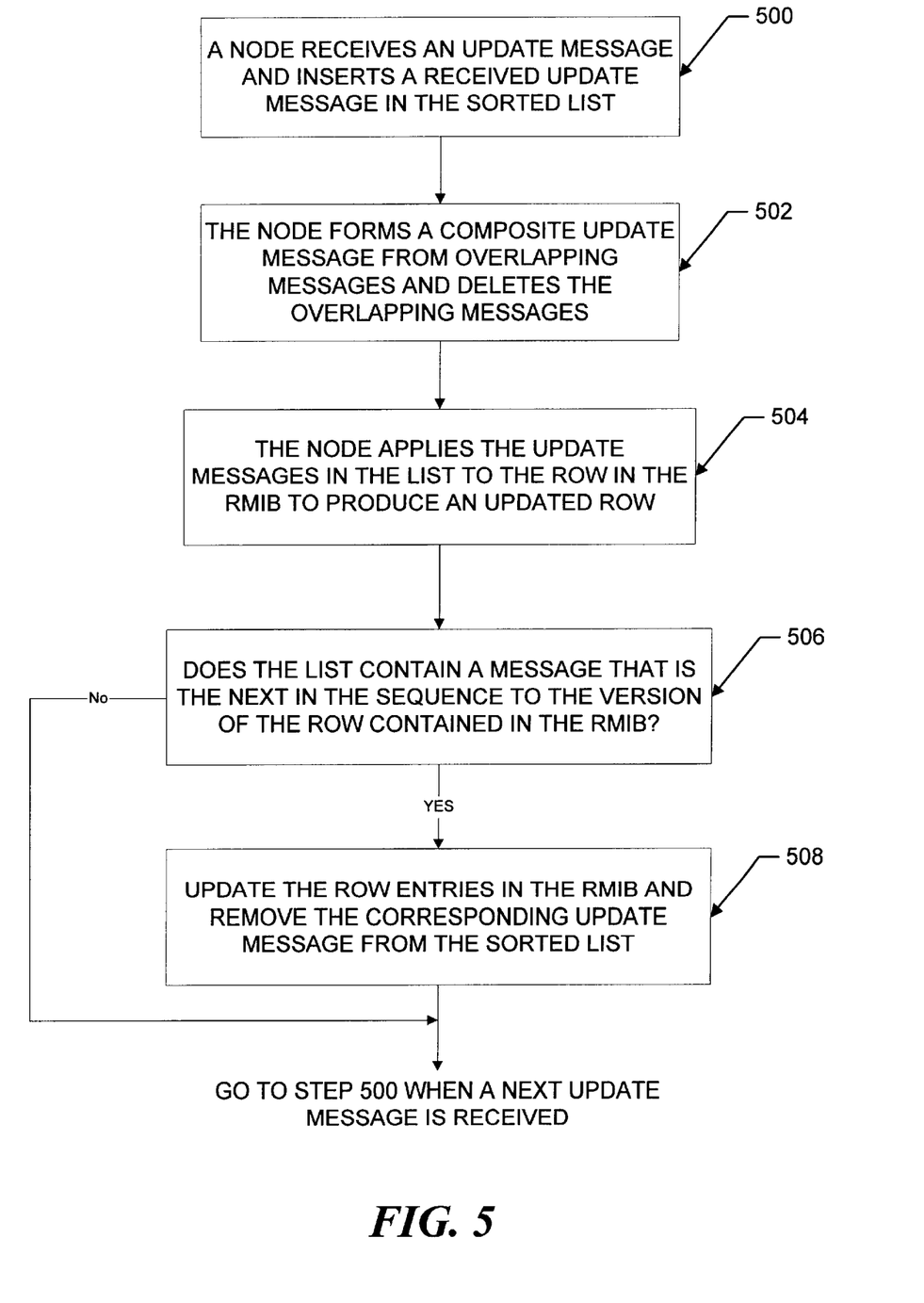
FIG. 5 is a flow chart of further operations of the system to update the RMIB.

Referring now to FIG. 5, a node maintains for every row a sorted list of non-overlapping update messages, in order to make use of the update messages as they are received. When the node receives an update message, the node inserts the update message in the sorted list (step 500). Any overlapping update messages are then combined into a composite update message, and the overlapping messages are deleted from the list (step 502).

To produce an updated row, the node applies all of the update messages contained in the list, in order, to the version of the row contained in the RMIB (step 504). As appropriate, the node compares the updated row entries with the entries in the last report sent to a user or application, and reports any relevant changes.

When list contains a message that is the next in the sequence from the version of the row contained in the RMIB, the node changes the row in the RMIB to the later version, stores the new version number and removes the applicable message from the list (step 508).

If, for example, a node receives the first V of the update messages, it updates the row in the RMIB with the composite update message $U_{0,V}$, such that the RMIB contains version V of the row. If the node next receives the update message $U_{V+2,V+3}$ the node holds update messages in its sorted list, and applies the update to the version of the row. As appropriate, the node notifies the user of any changes that were not included in an earlier report, but it does not change the row in the RMIB.

If the node next receives the update message $U_{V+1,V+2}$, the node includes the update message in the list and produces the composite message $U_{V+1,V+3}$ from the overlapping messages $U_{V+2,V+3}$ and $U_{V+1,V+2}$. The node then deletes the overlapping messages from the list, and applies the composite message to the version V of the row, but again does not change the row in the RMIB. As appropriate, the updates included in the messages are reported.

If the node next receives the update message $U_{V,V+1}$, the node forms a composite update message $U_{V,V+3}$ and uses the composite message to change the version V of the row contained in the RMIB to version V+3 of the row. The node then deletes the update messages from the sorted list.

In order to keep the gossip messages small, the nodes gossip the latest "complete" version numbers associated with the respective rows, rather than the sorted lists of version numbers. For example, the node discussed above gossips the version number V, which corresponds to the version of the row in the view of the RMIB. The node will later gossip the version number M with M=V+1, V+2 . . . , after the node receives the appropriate overlapping messages and updates its view of the RMIB.

G. PROPAGATING FASTER FAILURE DETECTION INFORMATION

To detect node failures more quickly than can be done using the heartbeat count, the member nodes may be organized into a number of small groups, for example, pairs, with the nodes in a group located in relatively close geographic proximity to one another and preferably in the same sub-network. The nodes in a group send "ping"messages to one another at regular intervals. If a given node does not receive a ping message from a given peer for a predetermined number of intervals, the node determines that the peer node is down. The node then lists the change in the status column 36 (FIG. 2), and broadcasts the change in an update message. The nodes the receive the update status information can then use the information to, for example, re-route traffic. This method of propagating information about failed nodes is faster than the heartbeat count method, however it requires that the nodes maintain certain topology information, and it is thus more complex. The two methods may be used together, to ensure the timely detection of both node failures node re-boots.

H. REDUNDANT NETWORK CONNECTIONS

Figure 6:
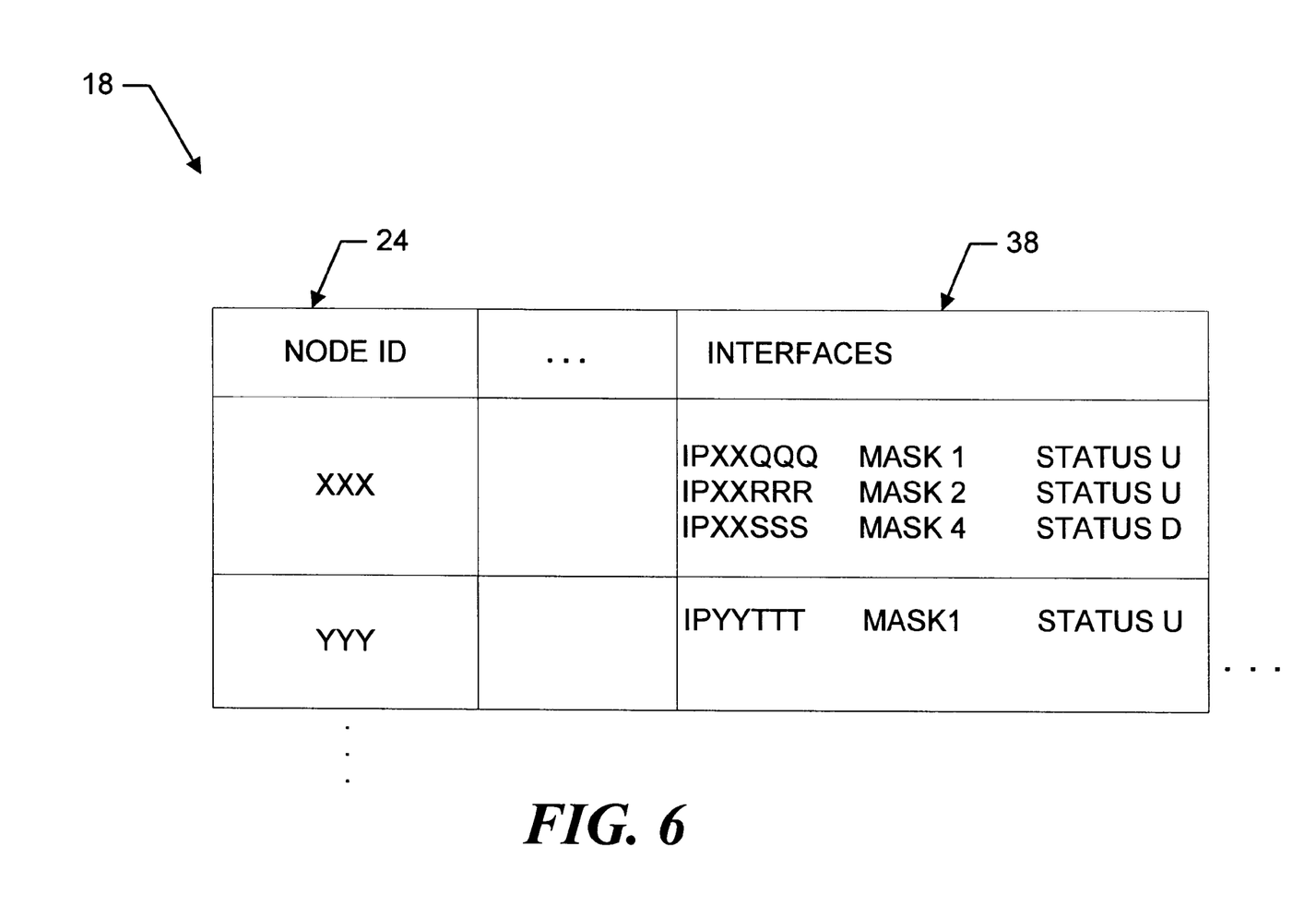
FIG. 6 depicts an additional column in the RMIB.

For more robust applications, the system takes advantage of redundant network connections to ensure that update messages are propagated across the membership. The RMIB 18 for such applications, as depicted in FIG. 6, includes an "interfaces" column 38 that contains information about the respective network interfaces of each of the member nodes.

Each node supplies as its entry to the interfaces column 38 the following information for each of its network interfaces: (a) the traffic at a primary IP address (b), a corresponding sub-network mask that identifies the sub-network to which the node belongs and (c) an up/down status indicator.

The gossip messages are sent between network interfaces based on the information in the RMIB, and are extended to include therein the gossiping node's view of the interfaces column and the corresponding row version number. The gossip message thus includes all of the entries in the node identifier column 24 and the associated version numbers, and a segment of the gossiping node's row. As appropriate, the receiving node treats the gossip message as an update message, to update the RMIB with the included row segment as discussed in Section F above. The "partial" update has an associated version number V,V, to indicate that it can be merged with the update message that produces the version V of the row. The receiving node then uses the remaining information in the gossip message as discussed above.

Each node monitors the traffic at all of its network interfaces and, if a particular interface has not received any gossip or broadcast messages for a predetermined time, the node declares that the interface is down. The node then updates the status of the interface in the interfaces column, and broadcasts the change to the member nodes. Similarly, the node broadcasts any changes to the IP addresses or sub-network masks, and so forth.

The member nodes continue to gossip to the listed interfaces regardless of their status, so that each node can readily detect a change of status. However, the member nodes send the update messages through active interfaces, based on the updated interface information in the RMIB.

When a node enters the membership, either by joining a network or re-booting after a failure, the node broadcasts its interface column information. The member nodes then gossip to these interfaces. The new node thus quickly learns an approximation of the network topology by learning which interfaces are on the same sub-networks.

I. ADAPTIVE ROUTING

In networks with sub-network structure, the system uses point-to-point delivery between sub-networks and multicast delivery over the sub-networks. To do this, a node sends its update message to "representative" members on each sub-network, instead of broadcasting it to the entire membership. The node thus sends the update message to an active interface of each representative node, and the representative nodes then multicast the update message across the sub-networks using a conventional IP multicast protocol.

The updating node selects itself as the representative node on its own sub-network, and uses the information in the RMIB to select representative nodes that have active interfaces on the sub-networks of interest. Further, using the topology information in the RMIB, the node selects representatives on a minimum set of sub-networks that includes all of the members. The node does not select a representative in a redundant sub-network, and thus attempts to minimize the delivery of multiple copies of the update message in a sub-network.

The node determines the appropriate set of sub-networks and selects members from them at random, to minimize disruptions that might otherwise occur when a particular node or interface goes down.

Figure 7:
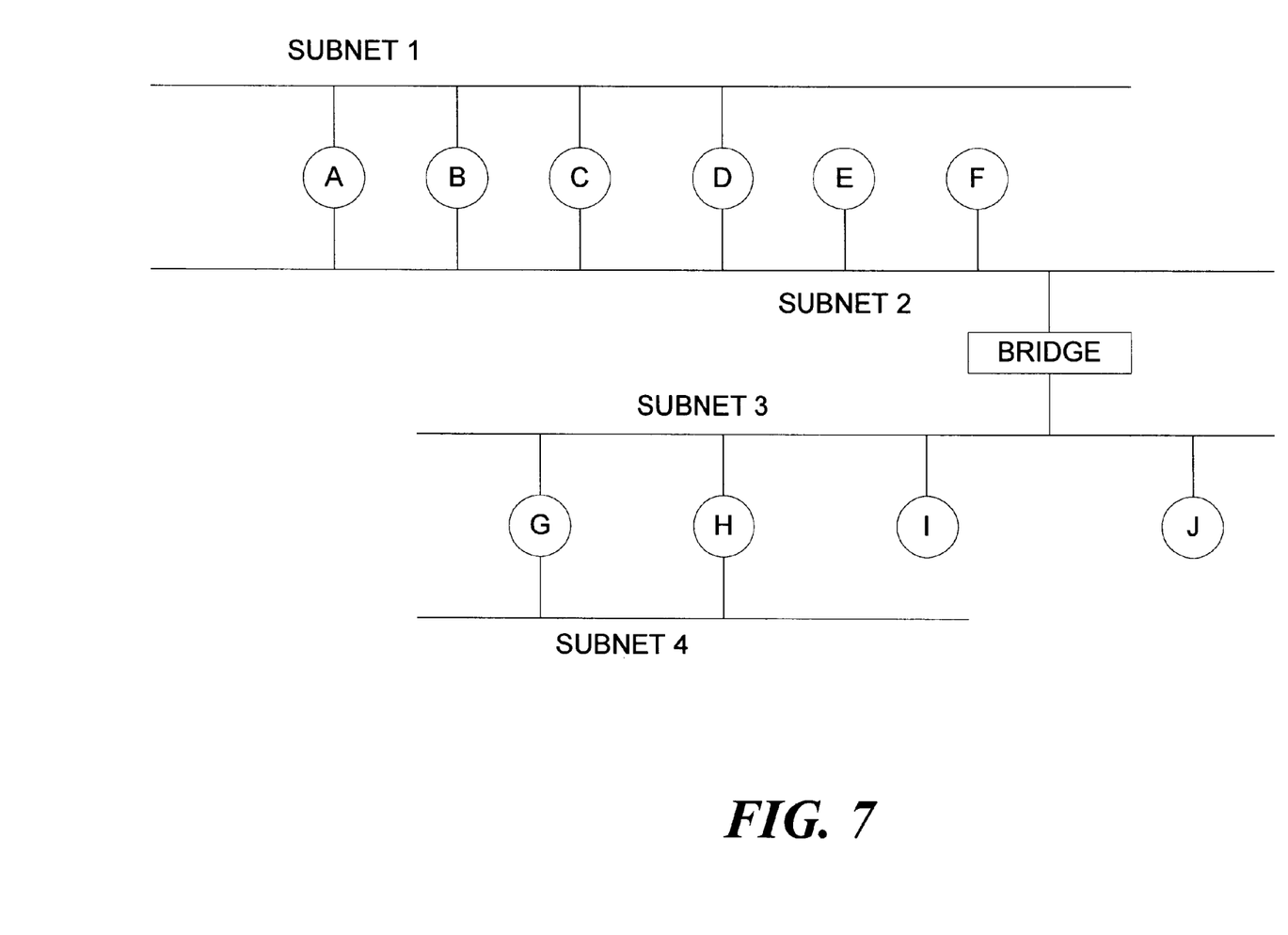
FIG. 7 depicts the system of FIG. 1 subdivided into subnetworks.

Referring now to FIG. 7, an updating node F selects itself as a representative node for sub-net 2, and through the sub-network communicates with nodes A–F, assuming the message is not lost during the IP multicast. The node F also chooses the node H as representative of the subnets 3 and 4. Conversely, the node may select, for example, nodes G and I as the representative nodes for the respective subnets 3 and 4. There is no need to choose a representative node for the subnet 1, since all the nodes on that sub-network are reachable through the subnet 2.

If the interface of node B to subnet 2 fails, the node F learns of the failure through an update to its view of the RMIB. When the node F sends out a next update message, the node selects representatives on subnets 1–4, and communicates with the node B through its active interface on subnet 1.

What is claimed is:

1. A system for communicating information among nodes of a network, the system including:

A. a replicated management information data base with columns containing information to be shared among nodes and a row for each node that is to share the information, the nodes sharing the information being members and each member node maintaining a view of the data base;

B. row updating means changing a row of the data base, the updating means allowing each member node to make changes to the corresponding row and associating a row version number with the changes made to the row by the member node;

C. update messaging means for providing, when changes are made by the member node to the corresponding row in the data base, a message that contains the changes and identifies the row to which the changes were made; and D. updating means for updating the views, the updating means including in a given view the changes made to the row and the associated row version number by the corresponding member node.

2. The system of claim 1 wherein the updating means includes in a given view the changes associated with a version number that is larger than the version number associated with the corresponding row in the view.

3. The system of claim 2 further including gossip messaging means for
 i. providing to the members gossip messages that include information which identifies the last change to each row of the view at a gossiping node,
 ii. providing to the gossiping node changes that are included in the view of the data base at the given member node but are not included in the view at the gossiping node.

4. The system of claim 1 further including a means for monitoring the interfaces of a given node, the means providing to the view of the data base at the given node the status of each of the interfaces.

5. The system of claim 4 wherein the update messaging means sends information to the respective member nodes over interfaces that are listed in the associated view of the data base as having active statuses.

6. The system of claim 5 further including gossip messaging means for
 i. providing to the members gossip messages that include information which identifies the last change made to each row of the view of the data base at a gossiping node, and
 ii. providing to the gossiping node changes that are included in the view of the data base at the given member node but are not included in the view at the gossiping node.

7. The system of claim 6 wherein the gossip messaging means provides gossip messages to any interface listed in the applicable view of the data base.

8. The system of claim 1 wherein the row updating means associates with each change two row version numbers, namely, a first row version number that indicates the new row version number and a second row version number that indicates the row version to which the changes were made.

9. The system of claim 8 wherein
 i. the update messaging means sends update messages that include the information that was changed in a given row and the two row version numbers, and
 ii. the updating means alters the corresponding row in a given view of the data base if the second row version number is the same as the row version number associated with the row in the view.

10. The system of claim 9 wherein the updating means further holds the update messages in a list that is ordered by the second version number in the messages and updates the row by applying the listed update messages to the version of the row contained in the given view of the data base.

11. The system of claim 10 wherein the updating means combines overlapping update messages into a composite message and applies the composite message to the version of the row contained in the given view of the data base.

12. A system for communicating information among nodes of a network, the system including:
 A. a replicated management information data base with columns containing information to be shared among nodes and a row for each node that is to share the information, the nodes sharing the information being members and each member node maintaining a view of the data base;
 B. row updating means for changing a row of the data base, the updating means allowing each member node to make changes to the corresponding row;
 C. update messaging means for providing, when changes are made by the member node to the corresponding row in the data base, a message that contains the changes and identifies the row to which the changes were made;
 D. updating means for updating the views, the updating means including in a given view the changes made to the row by the corresponding member node; and
 E. means for sending ping messages between associated members, said means sending to the updating means a list of associated members that have not sent ping messages within a predetermined time period.

13. The system of claim 12 wherein the row updating means removes from a given view the rows associated with the members that have not sent the ping messages.

14. A system for communicating information among nodes of a network, the system including:
 A. a replicated management information data base with columns containing information to be shared among nodes and a row for each node that is to share the information, the nodes sharing the information being members and each member node maintaining a view of the data base;
 B. row updating means for changing a row of the data base, the updating means allowing each member node to make changes to the corresponding row;
 C. update messaging means for providing, when changes are made by the member node to the corresponding row in the data base, a message that contains the changes and identifies the row to which the changes were made, the updating means
  selecting as recipients of the messages a set of members that includes a members that connect respectively to each associated sub-network,
  sending the messages to each of the members in the set, and
  broadcasting the messages from the members in the set to the members in the respective sub-networks, and
 D. updating means for updating the views, the updating means including in a given view the changes made to the row by the corresponding member node.

15. A method for communicating information among nodes of a network, the method including:
 A. maintaining at each node a view of replicated management information data base with columns containing information to be shared among nodes and a row for each node that is a member and shares the information;
 B. updating a row of the data base by the member associated with the row;
 C. updating a version number when a member updates the associated row of the data base;
 D. sending update information about the row from the associated member to one or more of the remaining members and including the version number in the update information, and
 E. updating the respective rows in the view of each member that receives the update information if the corresponding version number included in the update information is larger than the version number associated with the row in the view.

16. The method of claim 15 further includes the steps of
   i. providing to the members gossip messages that include information which identifies the last change to each row of the view at a gossiping node, and
   ii. providing to the gossiping node changes that are included in the view at a receiving member but are not included in the view at the gossiping member.

17. The method of claim 15 wherein the step of updating a version number with each change to a given row further includes associating with the change a second version number that indicates the row version to which the changes were made.

18. The method of claim 17 wherein
   a. the step of sending update information includes the step of including the two row version numbers in the update information, and
   b. the step of updating a given view alters the corresponding row in the given view if the second row version number in the update message is the same as the row version number associated with the row in the view.

19. The method of claim 18 wherein the step of updating further includes the steps of
   i. holding the update information in a list that is ordered by the second associated version numbers, and
   ii. updating the row by applying the listed update messages to the version of the row contained in the given view of the data base.

20. The method of claim 19 wherein the step of updating further combines overlapping update messages into a composite message and applies the composite message to the version of the row contained in the given view of the data base.

21. The method of claim 17 further including the steps of
   i. providing to the members gossip messages that include information which identifies the last change to each row of the view at a gossiping node, and
   ii. providing to the gossiping node changes that are included in the view at a receiving member but are not included in the view at the gossiping member.

22. A method for communicating information among nodes of a network, the method including:
   A. maintaining at each node a view of replicated management information data base with columns containing information to be shared among nodes and a row for each node that is a member and shares the information;
   B. monitoring network interfaces of a given node;
   C. including in the data base the status of each of the network interfaces;
   D. updating a row of the data base by the member associated with the row;
   E. sending update information about the row from the associated member to one or more of the remaining members;
   F. updating the rows in the view of each member that receives the update information.

23. The method of claim 22 further including in the step of sending the update information sending the update information to selected ones of the interfaces that are listed as having active statuses.

24. A method for communicating information among nodes of a network, the method including:
   A. maintaining at each node a view of replicated management information data base with columns containing information to be shared among nodes and a row for each node that is a member and shares the information;
   B. updating a row of the data base by the member associated with the row;
   C. sending ping messages between associated members;
   D. listing as failed those associated members that have not sent ping messages for a predetermined time;
   E. sending update information about the row from the associated member to one or more of the remaining members and including in the update information a list of the associated members that have failed since the last update information was sent;
   F. updating the rows in the view of each member that receives the update information.

25. The method of claim 24 further including the steps of
   d. incrementing an associated counter when a gossip message is received from a given member,
   e. listing a given node as failed if the counter is not incremented within a predetermined interval,
   f. removing the node from the data base if the associated counter is not incremented within an additional predetermined interval.

26. The method of claim 25 wherein the step of incrementing the counter includes incrementing the counters associated with the respective members listed in the gossip message if the counts included in the gossip message are larger than the associated counts at the receiving member.

27. The method of claim 26 further includes the step of adding to a view a row associated with a member that has a count in the gossip message but no row in the view.

28. A method for communicating information among nodes of a network, the method including:
   A. maintaining at each node a view of replicated management information data base with columns containing information to be shared among nodes and a row for each node that is a member and shares the information;
   B. updating a row of the data base by the member associated with the row;
   C. selecting as recipients of update information a set of members that includes a node that connects respectively to each associated sub-network;
   D. sending the update information to each of the members in the set;
   E. broadcasting the update information from the members in the set to the members in the respective sub-networks; and
   F. updating the rows in the view of each member that receives the update information.

* * * * *